Patented Feb. 3, 1931

1,791,077

UNITED STATES PATENT OFFICE

LUDWIG WEBER, OF BERLIN, GERMANY

METHOD OF MANUFACTURING BRIQUETTES FROM CLAY, SULPHITE LIQUOR, AND CARBONACEOUS MATERIAL

No Drawing. Application filed July 18, 1927, Serial No. 206,804, and in Germany July 24, 1926.

This invention relates to a method of manufacturing briquettes, more particularly, but not exclusively from low volatile fuels, fine ores, flue dust and the like with the aid of binders.

The best property of clay as a binder for the manufacture of fuel, ore and like briquettes resides in the fact that briquettes made therewith stand up in the fire in an extraordinary manner, so that the serious disadvantage of many otherwise apparently suitable binders is avoided. During combustion of the briquettes a burning of the clay binder, and consequently a strengthening of the binding structure, occurs, which explains the good fire resistance referred to. Too much importance also cannot be attached to the fact, that, owing to the known properties of clay, the binder structure is very porous, as this ensures the porosity of the briquette and thereby its complete combustion. Moreover, contrary to cases in which pitch or the like are employed, no foreign hydrocarbons, which tend to change its character as a fuel, are added to the latter and as the clay acts only as a binder the clay-fuel briquette is equivalent, from the fuel point of view, to the raw material.

It is also noteworthy that, owing to the infusibility of the clay, the melting point of the ashes is raised whereby a fusion of the ashes is in most cases avoided, and the latter are thus obtained in a sandy condition.

The following four advantages may therefore be ascribed to clay as a binder, from the fuel point of view:—

1. Particularly good capacity of the briquettes to maintain their shape in the fire.
2. Porous structure of the binder, and therefore good combustion of the fuel.
3. No change in the nature of the fuel, e. g. in the case of anthracite, coke, semi-coke and the like.
4. Sandy and consequently easily removable ashes.

The disadvantage of clay briquettes, which in spite of repeated attempts has hitherto prevented their introduction, resides in the fact that their strength and still more their resistance against friction, are so small that transport has not been possible. To overcome this difficulty is the object of the present invention.

All such measures which, although they may render the goods suitable for transport, make the briquettes of close and firm structure, as for example occurs when hydrocarbons are added, appear to be wholly unsuitable for attaining this object, namely the improvement of the clay briquette particularly with reference to its transportability. The reason for this is that such measures deprive the briquette of the porosity which is necessary for good combustion and that in many cases, for example in the case of low volatile fuels, they change the fuel character of the material.

Attempts were therefore made to overcome the difficulty by ever increasing the clay content of the briquettes, and from 10%–15% and even more clay had to be added.

As however, the ash content of the briquette is increased by the whole amount of the added clay such addition meant an intolerable increase in ash content and this fact has hitherto prevented the manufacture of high grade briquettes.

Careful experiments have shown how the advantages of clay briquettes enumerated above can be achieved without such an increase in the amount of clay employed; this being possible with additions of only from three to six per cent of clay according to the nature of the material to be briquetted; this can be achieved inter alia by a preliminary grinding of the clay to as fine a state as possible, preferably in a colloid mill. The effect is particularly favourable when ordinary clay of high plasticity such as is contained in the over-burden of many lignite mines is employed. In place of grinding a thorough suspension in water can also be employed. It follows that even waste clay can now be successfully utilized as a binder.

The increase in strength and resistance against friction thus produced can, however, be still further materially increased and that—in a surprising manner— by the simultaneous addition of clay and sulphite waste liquor. Practical experiments have shown that if certain conditions are maintained the disadvantageous effect of sulphite waste liquor on the porosity of clay briquettes which has hitherto been a source of difficulty does not occur. In carrying out the operation the material to be briquetted mixed with clay is moistened not as previously with water, but with dilute sulphite waste liquor or better still, very finely ground clay, or clay in the form of a thin slime is treated with sulphite lye so as to form an emulsion like mixture and this mixture is then added to the fuel to be briquetted. Such a mixture of binders produces a briquette which whilst fully maintaining the advantages from a fuel point of view of the clay briquette and the well known mechanical strength of a sulphite waste liquor briquette, has only a relatively small and permissible increase in ash content.

This advantage which accrues from the use of sulphite lye in a clay briquette is partly accounted for by the fact that the addition of clay removes the hygroscopic properties of sulphite waste liquor and thus also removes a material disadvantage of this liquor; the briquettes may be stored for a long time although they may be more or less water soluble depending on the nature of the material which has been briquetted.

There is no difficulty in treating the material to be briquetted or the pressed briquettes either before or after briquetting for the purpose of rendering the product water and weather resisting. This object can be achieved in advance by adding a suitable chemical to the material to be briquetted before pressing. The treatment after briquetting, which is in many cases to be preferred, may be carried out in a way already known for pitch and cellulose pitch briquettes, namely, by roasting or kiln drying the pressed briquettes, the mixture of binders being particularly suitable for this treatment.

The fact that clay and sulphite waste liquor, which moreover are both obtainable in any desired quantities as waste products, are miscible in the most varied proportions, enables the binder to be suited within wide limits to the nature of the material to be briquetted or the particular purpose for which the latter is to be employed.

Briquettes, and more particularly such as are made of fuel, e. g. lignite or coal, anthracite, coke, semi-coke and the like as well as such of very fine ores, flue dust and the like, can be made in any known and/or suitable shape according to the invention and in any known and/or suitable briquette presses.

Claims:

1. In a method of manufacturing briquettes, the steps which comprise mixing a very finely divided clay of great plasticity with the particles to be briquetted, and moistening the mixture of clay and the material to be briquetted with sulfite waste liquor.

2. A method of manufacturing briquettes which comprises producing an emulsion-like suspension of very finely divided clay in sulfite waste liquor, adding the material to be briquetted, mixing and forming the briquettes.

3. A method of manufacturing briquettes with a binder containing clay and sulfite waste liquor which comprises mixing the material to be briquetted with said ingredients without the addition of water, moistening and steaming the mass, kneading while continuing to warm the mass, and pressing to form briquettes.

4. A method of manufacturing briquettes which comprises mixing a binder containing finely divided clay and sulfiite waste liquor with the material to be briquetted, adding a substance to the mass which is adapted to render the sulfite waste liquor insoluble in water, and pressing the material to form briquettes.

In testimony whereof I have affixed my signature.

LUDWIG WEBER.